US012759076B2

(12) United States Patent
Basanese et al.

(10) Patent No.: US 12,759,076 B2
(45) Date of Patent: Oct. 13, 2026

(54) LASER CUTTING SELF-WRAPPING, SPLIT SLEEVES FROM CONTINUOUS FEED

(71) Applicant: Rofin-Sinar Technologies LLC, Plymouth, MI (US)

(72) Inventors: Robert Basanese, Santa Clara, CA (US); Charles Dodson, Santa Clara, CA (US); Phillip Palise, Santa Clara, CA (US)

(73) Assignee: Rofin-Sinar Technologies LLC, Plymouth, MI (US)

( * ) Notice: Subject to any disclaimer, the term of this patent is extended or adjusted under 35 U.S.C. 154(b) by 742 days.

(21) Appl. No.: 18/033,650

(22) PCT Filed: Oct. 14, 2021

(86) PCT No.: PCT/US2021/054909

§ 371 (c)(1),
(2) Date: Apr. 25, 2023

(87) PCT Pub. No.: WO2022/093537

PCT Pub. Date: May 5, 2022

(65) Prior Publication Data

US 2023/0398631 A1 Dec. 14, 2023

Related U.S. Application Data

(60) Provisional application No. 63/108,108, filed on Oct. 30, 2020.

(51) Int. Cl.
*B23K 26/08* (2014.01)
*B23K 26/082* (2014.01)
(Continued)

(52) U.S. Cl.
CPC ........ *B23K 26/0838* (2013.01); *B23K 26/082* (2015.10); *B23K 26/123* (2013.01);
(Continued)

(58) Field of Classification Search
CPC .... B23K 26/38; B23K 26/082; B23K 26/702; B23K 26/16; B23K 26/123;
(Continued)

(56) References Cited

U.S. PATENT DOCUMENTS

| | | | | |
|---|---|---|---|---|
| 6,207,925 | B1 | 3/2001 | Kendall | |
| 6,966,164 | B2 * | 11/2005 | Navarro | B65C 9/0065 53/399 |
| 9,643,743 | B2 * | 5/2017 | Heeman | B29C 63/423 |
| 10,508,052 | B2 | 12/2019 | Wada et al. | |
| 2011/0056350 | A1 * | 3/2011 | Gale | B23K 26/38 83/451 |

(Continued)

FOREIGN PATENT DOCUMENTS

| | | | |
|---|---|---|---|
| DE | 102008056554 | A1 | 5/2010 |
| EP | 3628764 | A1 | 4/2020 |

(Continued)

OTHER PUBLICATIONS

International Search Report and Written Opinion received for International Patent Application No. PCT/US2021/054909 mailed on Jan. 27, 2022, 12 pages.

*Primary Examiner* — Brian W Jennison
(74) *Attorney, Agent, or Firm* — TraskBritt

(57) ABSTRACT

An apparatus, and associated method, laser cuts self-wrapping, woven or braided split sleeves from a continuous feed of sleeve material by sweeping a laser beam across the continuously fed material. Instead of sweeping the laser beam straight across the material in a direction perpendicular to the longitudinal axis of the material, the sweep path is angled to follow the feed rate of the material while the laser beam cuts through the material from one side to the other. Thus, a straight cut may be completed without stopping the feed. The apparatus includes a mandrel tor expanding the material before intersection with the laser beam to open a gap at the longitudinal split. The mandrel has a wedge-shaped tip with an end-surface profile that is at an oblique angle to the direction of motion of the material. The oblique (Continued)

angle at least approximately matches the sweep angle of the laser beam.

16 Claims, 9 Drawing Sheets

(51) Int. Cl.

| | |
|---|---|
| ***B23K 26/12*** | (2014.01) |
| ***B23K 26/16*** | (2006.01) |
| ***B23K 26/38*** | (2014.01) |
| ***B23K 26/70*** | (2014.01) |
| ***B23K 101/06*** | (2006.01) |

(52) U.S. Cl.
CPC .............. *B23K 26/16* (2013.01); *B23K 26/38* (2013.01); *B23K 26/702* (2015.10); *B23K 2101/06* (2018.08)

(58) Field of Classification Search
CPC ..... B23K 2101/06; A61F 2/91; H02G 3/0481; C03B 37/06; C03B 37/01205; C03B 37/01254
See application file for complete search history.

(56) References Cited

U.S. PATENT DOCUMENTS

| | | | | |
|---|---|---|---|---|
| 2015/0210416 | A1* | 7/2015 | Duncan | B65C 3/065 53/585 |
| 2018/0186679 | A1* | 7/2018 | Wada | C03B 33/06 |
| 2018/0215649 | A1* | 8/2018 | Wada | B28D 7/02 |
| 2020/0017251 | A1* | 1/2020 | Duncan | B29C 63/426 |

FOREIGN PATENT DOCUMENTS

| | | | |
|---|---|---|---|
| JP | 2011074526 | A | 4/2011 |
| WO | WO-199854393 | A1 | 12/1998 |

* cited by examiner

LASER CUTTING SELF-WRAPPING, SPLIT SLEEVES FROM CONTINUOUS FEED

CROSS-REFERENCE TO RELATED APPLICATIONS

This application is a U.S. national stage application under U.S.C. § 371 of International Application No. PCT/US2021/054909, filed Oct. 14, 2021, which claims the priority of U.S. Patent Application No. 63/108,108 filed on Oct. 30, 2020, the entire contents of each priority application is incorporated herein by reference.

BACKGROUND OF THE DISCLOSURE

Self-wrapping, woven or braided split sleeves are used to bundle a collection of cables (or wires or cords) to both protect and cleanly route the cables. A split sleeve is a flexible tube with a split extending along its full length. In its relaxed state, the material of the split sleeve wraps into its tube shape, typically with some overlap at the split. The split sleeve is easily unfolded to open the split, such that the split sleeve can be wrapped around a bundle of cables instead of having to feed the cables into a closed tube.

Woven split sleeves are typically made of a weave of plastic yarn. Similarly, braided split sleeves are typically made of braided plastic yarn. Due to their woven or braided nature, these split sleeves are relatively flexible and allow routing of the cables around tight corners and curves. For any given application, the split sleeve is cut to length from a long supply (e.g., a spool) of tube-shaped woven or braided split-sleeve material that is already split along its length. One popular tool for cutting the split-sleeve material is a hot knife. The hot knife cuts through the material relatively easily, and has the additional advantage of causing some melting of the material at the cut ends, which helps prevent fraying.

Split sleeves are widely used in the automotive industry. For example, the multitude of cables controlling a power seat may be bundled together in a single split sleeve and thus routed to a common controller in a protected and organized fashion.

SUMMARY OF THE DISCLOSURE

Disclosed herein is an apparatus and method for laser cutting self-wrapping, woven or braided split sleeves from a continuous feed of self-wrapping, woven or braided split sleeve material. Each cut is made by sweeping a laser beam across the continuously fed material. Instead of sweeping the laser beam straight across the material, in a direction perpendicular to the longitudinal axis of the material, the sweep path is angled to follow the feed rate of the material while the laser beam cuts through the material from one side to the other. As a result, a straight cut may be completed without stopping the feed. In contrast, conventional cutting processes such as hot-knife cutting requires stopping the feed for every cut. The presently disclosed laser-cutting apparatus and method offer a significant improvement in processing speed since no stopping and starting of the feed is needed. Some melting of the material occurs at the cut and helps prevent fraying.

The laser-cutting process relies on the material being (continuously) fed over a mandrel. The mandrel opens up a gap at the longitudinal split to prevent the laser beam from inadvertently fusing the longitudinal split. The laser beam intersects the material immediately as it leaves the mandrel.

The tip of the mandrel is angled in a manner that substantially matches the sweep path of the laser beam, such that the mandrel maintains a consistent shape of the material while the material is being cut by the laser beam.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE DISCLOSURE

Figure 1:
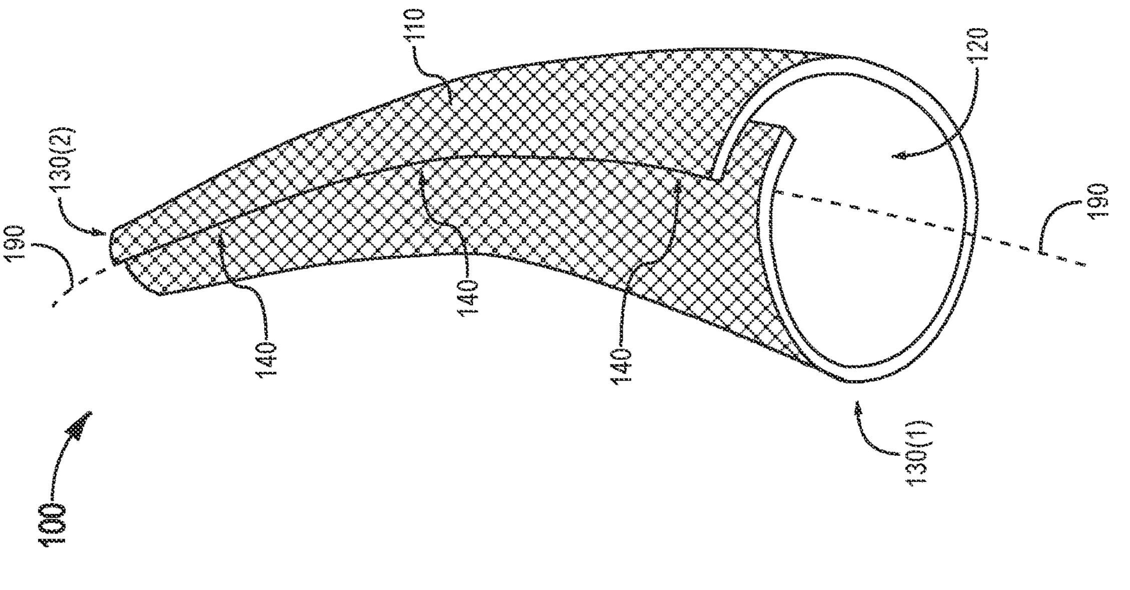
FIG. 1 illustrates a self-wrapping split sleeve, according to an embodiment.

Referring now to the drawings, wherein like components are designated by like numerals, FIG. 1 illustrates one self-wrapping split sleeve 100. Herein, the term "split sleeve" encompasses both woven and braided split sleeves. Sleeve 100 is made of a woven or braided fabric 110, such as polyester or other plastic yarns. Sleeve 100 has a longitudinal split 140 along its longitudinal axis 190. FIG. 1 shows sleeve 100 in its relaxed state where fabric 110 overlaps at split 140. Fabric 110 is flexible such that sleeve 100 may be opened at split 140 and allowed to self-wrap around a bundle of cables.

Figure 2:
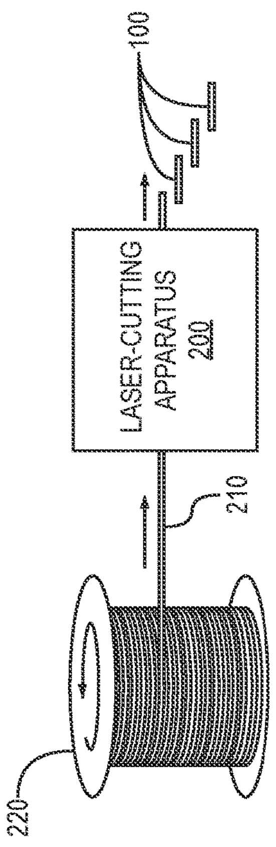
FIG. 2 schematically illustrates a laser-cutting apparatus in operation, according to an embodiment.

FIG. 2 schematically illustrates one laser-cutting apparatus 200 in operation. Apparatus 200 receives a continuous feed of self-wrapping split-sleeve material 210, for example from a spool 220. Apparatus 200 laser-cuts the continuously fed material 210 into a series of split sleeves 100. Each pair of successive cuts made by apparatus 200 form the two ends 130(1) and 130(2) of one split sleeve 100.

Figure 3:
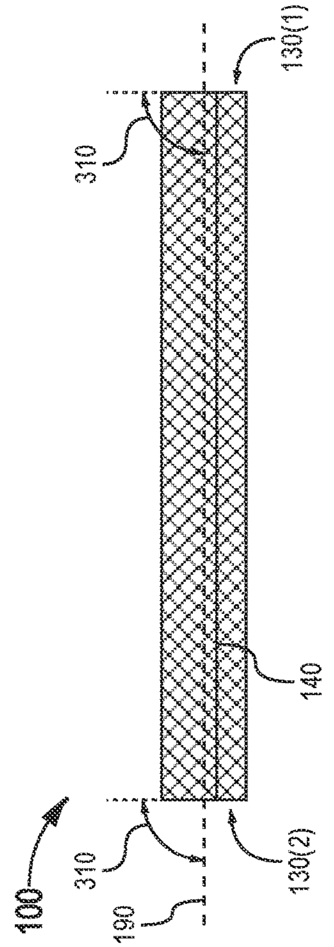
FIG. 3 shows the geometry of the ends of the split sleeve of FIG. 1 in further detail, according to an embodiment.

FIG. 3 shows the geometry of ends 130 of split sleeve 100 in further detail. Each end 130 is substantially straight and at an angle 310 to longitudinal axis 190. In one embodiment, the ends are square and angle 310 is substantially a right angle, for example in the range between 85 and 95 degrees. It is, however, also possible to form ends 130 that are not at a right angle to longitudinal axis 190, if non-square ends are desired for a particular application.

Figure 4:
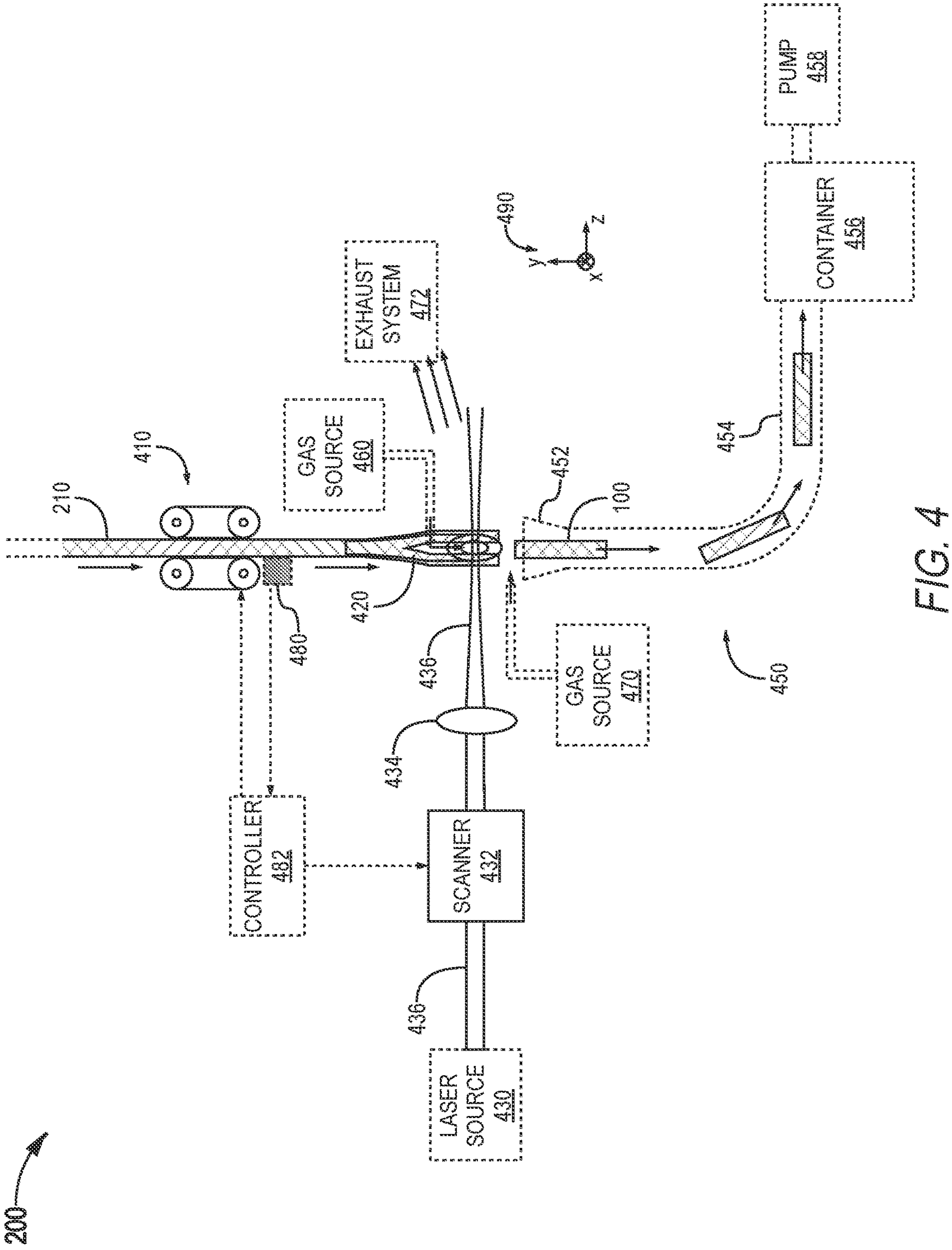
FIG. 4 is an overview diagram of a laser-cutting apparatus, according to an embodiment.

FIG. 4 is an overview diagram of laser-cutting apparatus 200. Apparatus 200 includes a conveyer 410, a mandrel 420, a scanner 432, and a lens 434. Conveyer 410 continuously feeds self-wrapping split-sleeve material 210 over mandrel 420 in the negative y-axis direction (see coordinate system 490). Mandrel 420 is partly obscured by material 210 in FIG. 4. More detailed illustrations of an embodiment of mandrel 420 are provided below in FIGS. 5A-5C. While FIG. 4 illustrates conveyer 410 as being located before mandrel 420, conveyer 410 may instead be located on mandrel 420.

Lens 434 focuses a laser beam 436 onto material 210 as it leaves mandrel 420. In one embodiment, lens 434 forms a waist in laser beam 436 at material 210. Scanner 432 sweeps laser beam 436 across the path of the continuously fed material 210, just beyond the tip of mandrel 420, to cut through material 210 in a single sweep. The propagation direction of laser beam 436, as it intersects material 210, is generally along the z-axis of coordinate system 490, although the scanning of laser beam 436 may lead to some deviation from laser beam 436 being precisely parallel with the z-axis. The manner in which laser beam 436 cuts through material 210 and the manner in which mandrel 420 aids this process, are discussed in further detail below in reference to FIGS. 6A-6E. Briefly, mandrel 420 (*a*) splays open the diameter of material 210 to open a gap at its longitudinal split, and (b) helps define the shape of material 210 while being cut by laser beam 436.

Scanner 432 may include one or more galvanometer scanners to deflect laser beam 436 in one or more respective directions and thereby change the position of laser beam 436 with respect to mandrel 420. Without departing from the scope hereof, laser beam 436 may propagate through lens 434 before reaching scanner 432, instead of scanner 432 directing laser beam 436 to lens 434 as depicted in FIG. 4. As an alternative to scanner 432, apparatus 200 may sweep the position of laser beam 436 by shifting the location of lens 434, optionally in conjunction with shifting the location or orientation of one or more other optical elements. Although not shown in FIG. 4, apparatus 200 may further include a translation stage that moves lens 434 with respect to mandrel 420, thereby shifting the waist of laser beam 436 along the propagation direction of laser beam 436, for example to position this waist at material 210. In one embodiment, apparatus 200 includes a laser source 430 for generating laser beam 436, as depicted. In another embodiment, laser beam 436 is delivered to apparatus 200 from a laser source located outside the apparatus. Laser source 430 is, for example, a carbon dioxide laser.

Apparatus 200 may include a collection system 450 that uses gravity and suction to collect sleeves 100 cut by laser beam 436. Collection system 450 includes a receptacle 452 and a conduit 454. The pressure in conduit 454 is lower than the ambient pressure at mandrel 420, such that sleeves 100 are sucked into conduit 454 via receptacle 452. Conduit 454 may transport sleeves 100 to a container 456. Collection system 450 further includes a pump 458 that provides the suction used to collect sleeves 100. In some embodiments, the container and the pump may be located outside apparatus 200.

Cutting of material 210 by laser beam 436 may lead to debris in the form of melted fabric removed from material 210. This debris may be tacky in nature. To prevent such tacky debris from building up on mandrel 420, mandrel 420 may be configured to accommodate a gas flow coaxial with the direction of motion of material 210 over mandrel 420. This coaxial gas flow emerges from the tip of mandrel 420 and helps force debris, and other waste, away from mandrel 420. Apparatus 200 may include a gas source 460 that supplies the coaxial gas flow. Gas source 460 may include a container of pressurized gas, or a pump for pushing ambient air through mandrel 420.

The cutting of material 210 may also produce toxic, or otherwise undesirable, fumes. Apparatus 200 may include an exhaust system 472 that removes such fumes.

In some scenarios, laser beam 436 is sufficiently intense to ignite material 210. Therefore, apparatus 200 may further include a gas source 470 (e.g., pressurized gas or a pump) that aims a combustion-quenching gas flow at the cuts made by laser beam 436, either in the region where laser beam 436 cuts material 210 or at another location shortly thereafter. The combustion-quenching gas is, for example, nitrogen or a noble gas.

Figures 5A, 5B, 5C:
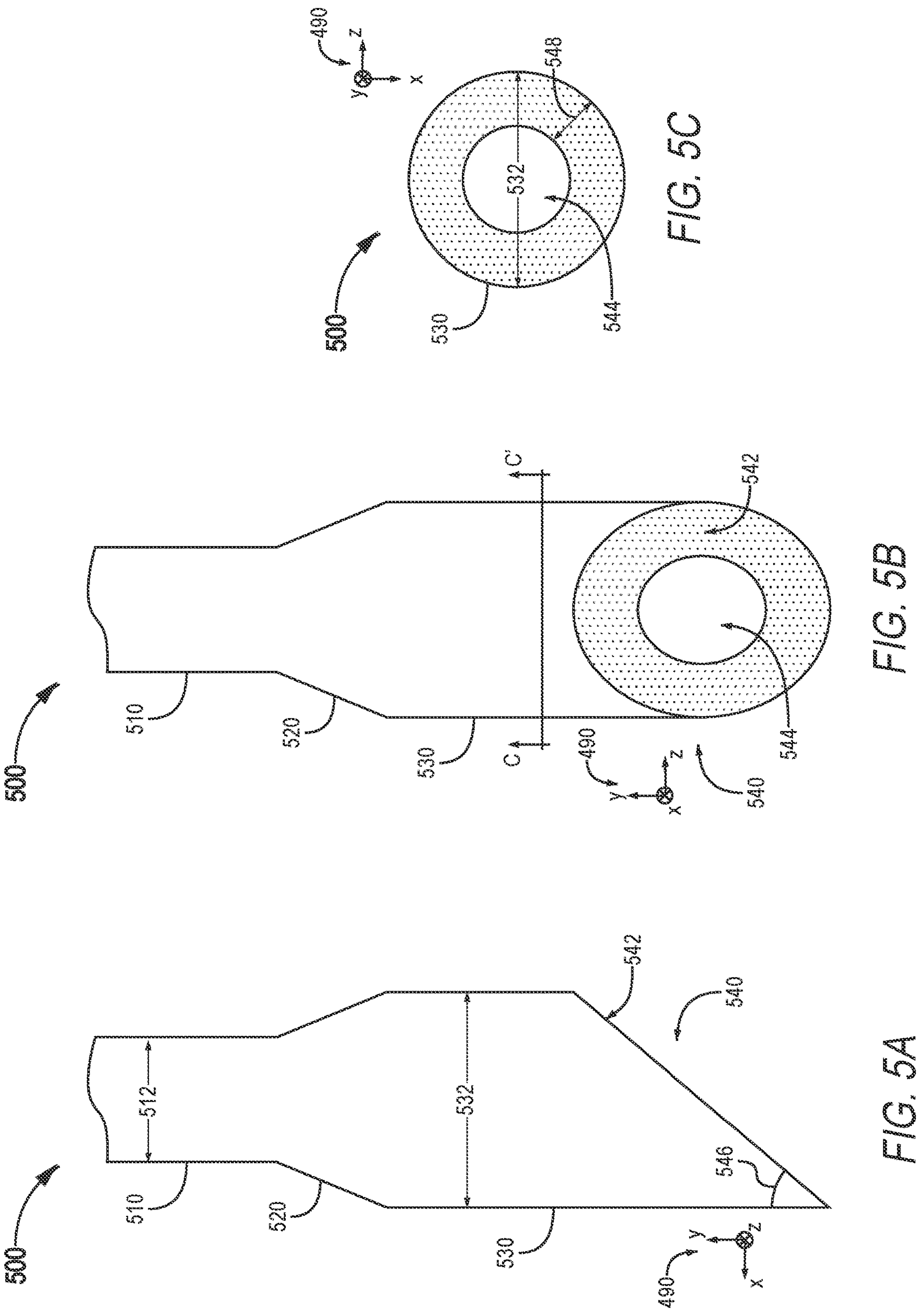
FIGS. 5A-5C illustrate a mandrel configured to expand the diameter of self-wrapping split-sleeve material and help define the shape of the material while being cut by a laser beam in the apparatus of FIG. 2, according to an embodiment.

FIGS. 5A-5C illustrate one mandrel 500 configured to expand the diameter of self-wrapping split-sleeve material 210 and help define the shape of material 210 while being cut by laser beam 436 in apparatus 200. Mandrel 500 is an embodiment of mandrel 420. FIGS. 5A and 5B are orthogonal side-views of mandrel 500 when implemented in apparatus 200 (see FIG. 4). The viewing directions for FIGS. 5A and 5B are parallel to the z- and x-axes, respectively, of coordinate system 490. FIG. 5C is a cross section of mandrel 500 taken in the xz-plane of coordinate system 490 at line C-C' indicated in FIG. 5B.

Mandrel 500 includes a receiving portion 510, an expansion portion 530, a transition portion 520 between portions 510 and 530, and a tip 540. Receiving portion 510 has a transverse size 512 suitable for accepting material 210 with some overlap at its longitudinal split. Expansion portion 530 has a diameter 532 that exceeds the diameter of material 210 in its relaxed state and forces open a gap at its longitudinal split. In one scenario, the inner diameter of material 210 is in the range between 4 and 10 millimeters in its relaxed state with the region of material overlap at the longitudinal split spanning being between 10% and 60% of the inner diameter or between 40% and 60% of the inner diameter, and diameter 532 is in the range between 5 and 15 millimeters.

Tip 540 is an extension of expansion portion 530 that has an angled end surface 542. End surface 542 is at an oblique angle 546 to the y-axis. End surface 542 may be planar. Tip 540 may maintain the same cross section as expansion portion 530, except for the cross section becoming increasingly truncated as the y-axis value decreases.

In an embodiment, mandrel 500 forms a hollow channel 544 that accommodates a coaxial gas flow. This coaxial gas flow is discussed above in reference to FIG. 4 and may be provided by gas source 460. Hollow channel 544 is surrounded by a wall of thickness 548. At end surface 542, it may be advantageous for thickness 548 to be relatively small, so as to minimize build-up of tacky debris on end surface 542 as well as on other outer surfaces of tip 540. In one implementation, thickness 548 is less than 1 millimeter. Expansion portion 530 may have a round cross section in the xz-plane, and tip 540 may have a similar round, but truncated, cross section in the xz-plane. The round cross section helps ensure good contact between material 210 and tip 540 such that, as material 210 advances along mandrel 500, material 210 helps clean off any tacky debris deposited on the outside of tip 540. The round cross section may be circular, as depicted in FIG. 5C, or oval. For comparison, an implementation with a rectangular cross section may suffer from tacky debris accumulating on the correspondingly planar outer surfaces of the tip.

FIGS. 6A-6E are a time series illustrating mandrel 500 in operation in apparatus 200, as well as illustrating sweeping of laser beam 436 to cut self-wrapping split sleeves 100 from self-wrapping split-sleeve material 210. FIGS. 6A-6E are presented in a view similar to that used in FIG. 5A.

Figure 6B:
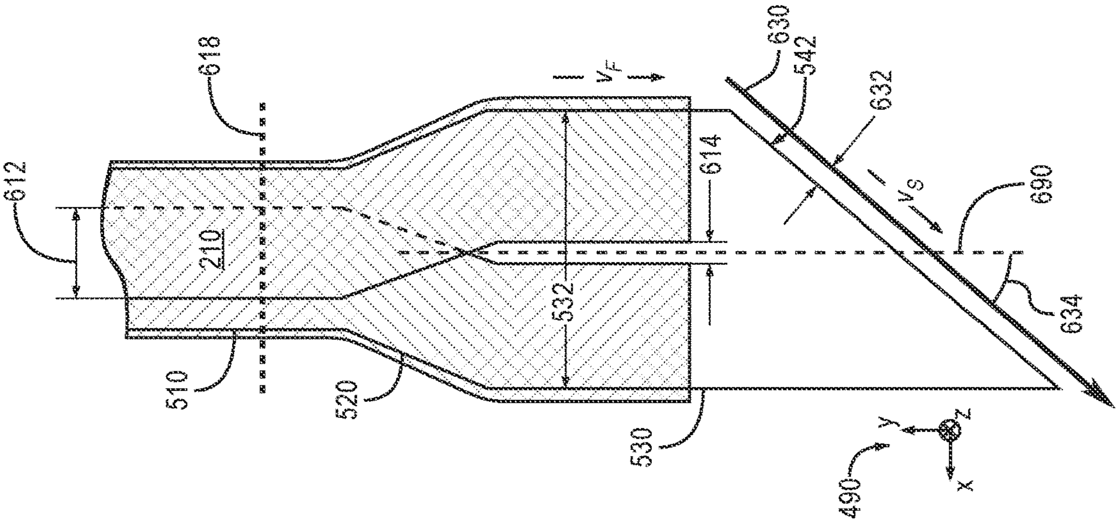
FIGS. 6A-6E are a time series illustrating the mandrel of FIGS. 5A-5C in operation in the apparatus of FIG. 2, as well as illustrating sweeping of a laser beam to cut self-wrapping split sleeves from self-wrapping split-sleeve material, according to an embodiment.
Figure 6A:
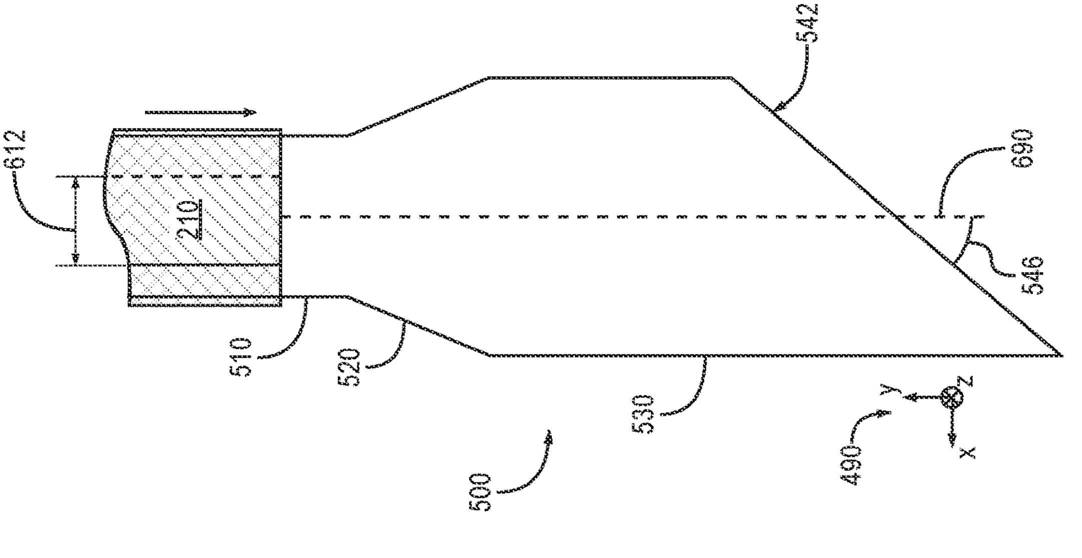

In FIG. 6A, a leading end of material 210 has been fed onto receiving portion 510, and continuously moves in the negative y-axis direction. At receiving portion 510, material 210 forms an overlap 612. In FIG. 6B, material 210 has moved onto expansion portion 530, and diameter 532 of expansion portion 530 has eliminated the overlap and instead opened a gap 614 at the longitudinal split. While FIGS. 6A-6E show gap 614 as being on the side of mandrel 500 facing laser beam 436 (as incident on material 210), gap 614 may be located on a different side of mandrel 500, without departing from the scope hereof. For example, gap 614 may be located on a side of mandrel 500 deemed most practical for location of a gas intake for the coaxial gas flow through hollow channel 544.

FIG. 6B further indicates a path 630 of the sweep of laser beam 436 to be effected by scanner 432 once a desired cut line 618 of material 210 reaches past end surface 542 of tip 540. Path 630 is at an oblique angle 634 to a longitudinal axis 690 of mandrel 500. Longitudinal axis 690 is parallel to the y-axis. Angle 634 is the consequence of the ratio between longitudinal and transverse sweep speeds of laser beam 436. The longitudinal sweep component goes in the negative y-axis direction. The longitudinal sweep speed matches the feed rate $v_F$ of material 210, so as to form a square cut that is orthogonal to the longitudinal axis of material 210 (ultimately longitudinal axis 190 of sleeve 100). The transverse sweep component goes in the positive x-axis direction. The transverse sweep speed is set to cooperate with the size and power of laser beam 436 to facilitate laser-cutting of material 210 in a single sweep along path 630. In scenarios where lens 434 forms a waist in laser beam 436 at material 210, the transverse sweep speed is set to cooperate with the waist diameter, Rayleigh length, and power of laser beam 436 to facilitate laser-cutting of material 210 in a single sweep along path 630. The longitudinal and transverse sweep speeds define a velocity vector $v_S$ of laser beam 436. In turn, velocity vector $v_S$ defines angle 634 of sweep path 630.

Angle 546 of tip 540 is compatible with a range of feed rates $v_F$ of material 210. The sweep speed of laser beam 436 along path 630 may be adjusted according to feed rate $v_F$ to maintain angle 634 of path 630, as long as the transverse sweep speed of laser beam 436 is sufficiently low that the cut through material 210 can be completed in a single sweep.

Figure 6E:
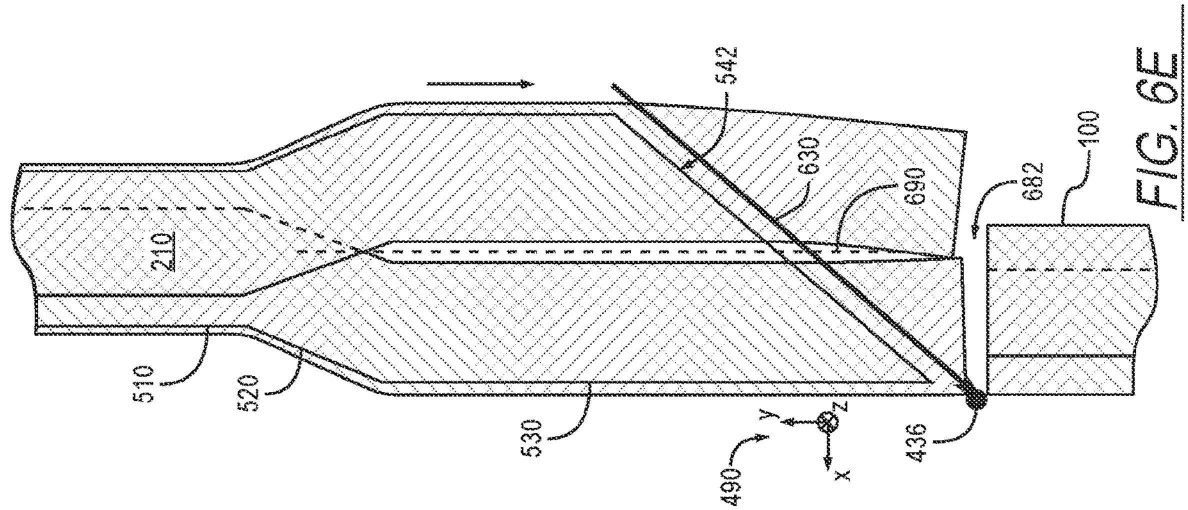
Figure 6D:
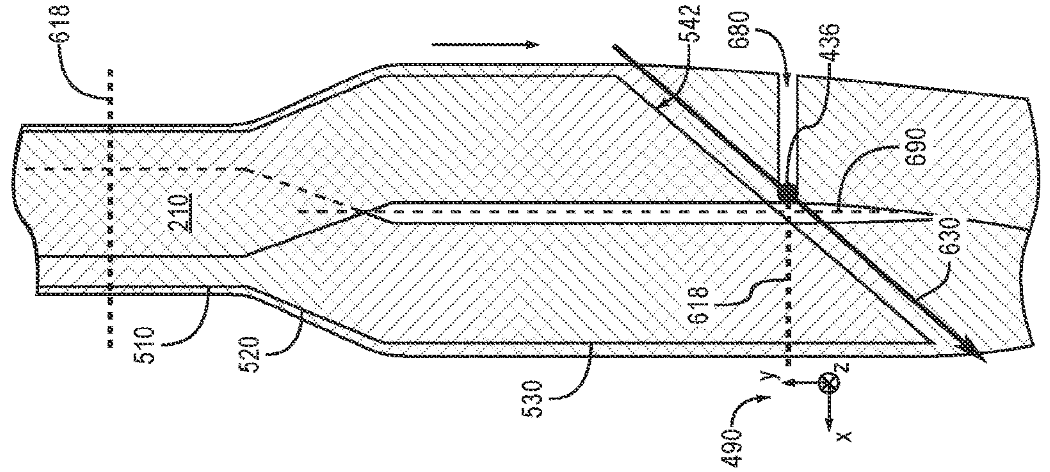
Figure 6C:
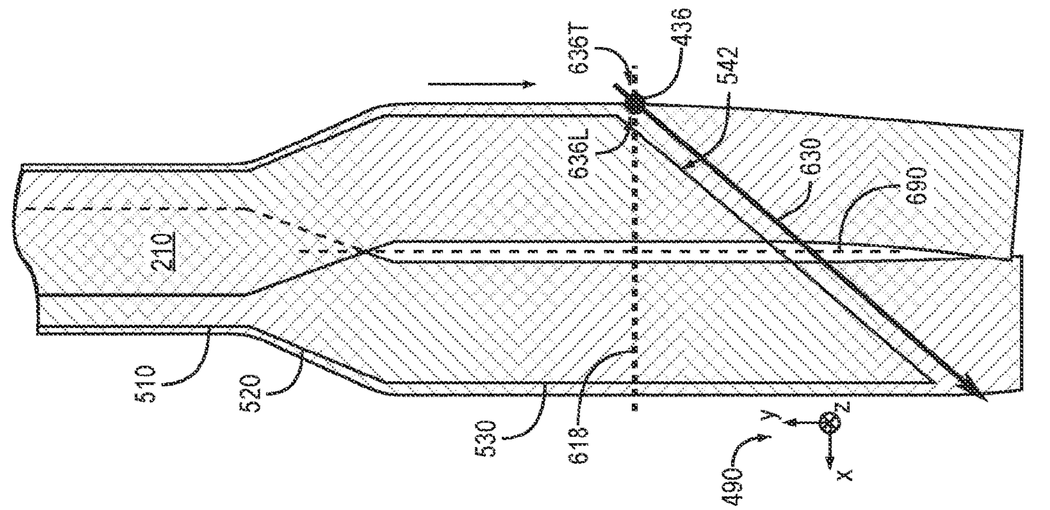

In FIG. 6C, material 210 extends beyond end surface 542, and cut line 618 has reached path 630. At this point in time, scanner 432 initiates the sweep of laser beam 436 along path 630. As material 210 and cut line 618 continue their motion in the negative y-axis direction, scanner 432 continues sweeping laser beam 436 along path 630, to form a partial cut 680 in material 210, as shown in FIG. 6D. By virtue of the choice of velocity vector $v_S$, cut 680 is parallel to the xz-plane. Ultimately, as shown in FIG. 6E, laser beam 436 completes a cut 682 that singulates one sleeve 100 from the continuously fed material 210. While laser beam 436 sweeps across material 210, gap 614 opened by expansion portion 530 of mandrel 500 ensures that laser beam 436 does not fuse the longitudinal split. Gap 614 may be in the range between 1 and 3 millimeters.

During cutting of material 210, laser beam 436 tends to melt material 210 at the cut edges. This melting helps prevent fraying of material 210 at the cut. Since material 210 is tube-shaped, the cutting process involves laser beam 436 simultaneously cutting (a) a portion of material 210 that is in front of mandrel 500 in the FIGS. 6C-6E views and (b) a portion of material 210 that is behind mandrel 500 in the FIGS. 6C-6E views. In a likely scenario, as laser beam 436 cuts into the tube-shaped material 210, a leading edge 636L (indicated in FIG. 6C) of laser beam 436 is absorbed primarily by the portion of material 210 that is in front of mandrel 500, while a trailing edge 636T (indicated in FIG. 6C) of laser beam 436 is absorbed primarily by the portion of material 210 that is behind mandrel 500.

Path 630 is offset from end surface 542 by a distance 632 (see FIG. 6B). Distance 632 is large enough to prevent mandrel 500 from intersecting laser beam 436. In one example, distance 632 is at least three times the $1/e^2$ waist radius of laser beam 436. It is, however, also advantageous to keep distance 632 small in order to let mandrel 500 define a consistent shape of material 210 during cutting by laser beam 436 along path 630. As indicated in FIGS. 6C-6E, as material 210 extends beyond end surface 542, material 210 begins to refold into its relaxed state. If distance 632 is increased significantly, this distortion of the shape of material 210 will cause cut 682 to be distorted as well. In one embodiment, angles 546 and 634 are identical, at least to within 5 degrees, such that distance 632 can be minimized. In an example, distance 632 is between 0.5 and 2 millimeters.

In one scenario, the feed rate $v_F$ of material 210 is in the range between 50 and 500 millimeters/second, the inner diameter of material 210 in its relaxed state is 8 millimeters, diameter 532 of expansion portion 530 is 10 millimeters, the transverse sweep speed is 200 millimeters/second. At a feed rate V F or 350 millimeters/second, the sweep speed of laser beam 436 along path 630 is approximately 400 millimeters/second, angles 546 and 634 are approximately 30 degrees, and it takes approximately 50 milliseconds to complete one cut across material 210. These parameters may be adjusted to accommodate different scenarios. In one more general example, angles 546 and 634 are in the range between 15 and 75 degrees. Apparatus 200 may be capable of cutting at least 3-5 sleeves per second, each having length in the range between 40 and 400 millimeters.

Without departing from the scope hereof, sweep path 630 and velocity vector $v_S$ may be chosen to form sleeve 100 with ends 130 that are at an oblique angle to longitudinal axis 190.

It is apparent from the above discussion that the path 630 and velocity vector $v_S$ of laser beam 436, as defined by scanner 432, as well as the tip profile of mandrel 420 are optimized for a certain feed rate $v_F$ of material 210. Referring again to FIG. 4, apparatus 200 may include (a) an encoder 480 that monitors the feed rate of material 210 either at mandrel 420 or in a location upstream of mandrel 420, and (b) a controller 482 that adjusts the operation of other elements of apparatus 200 according to a feed rate measured by encoder 480. Controller 482 may couple encoder 480 in a feedback loop with conveyer 410 to actively adjust the rate with which conveyer 410 feeds material 210 to mandrel 420, so as to maintain a target feed rate. Alternatively, or in combination therewith, controller 482 may be communicatively coupled with scanner 432 to adjust the sweep path and/or speed of laser beam 436 in the event that the feed rate of material 210, as measured by encoder 480, should deviate from the target value.

Figure 7:
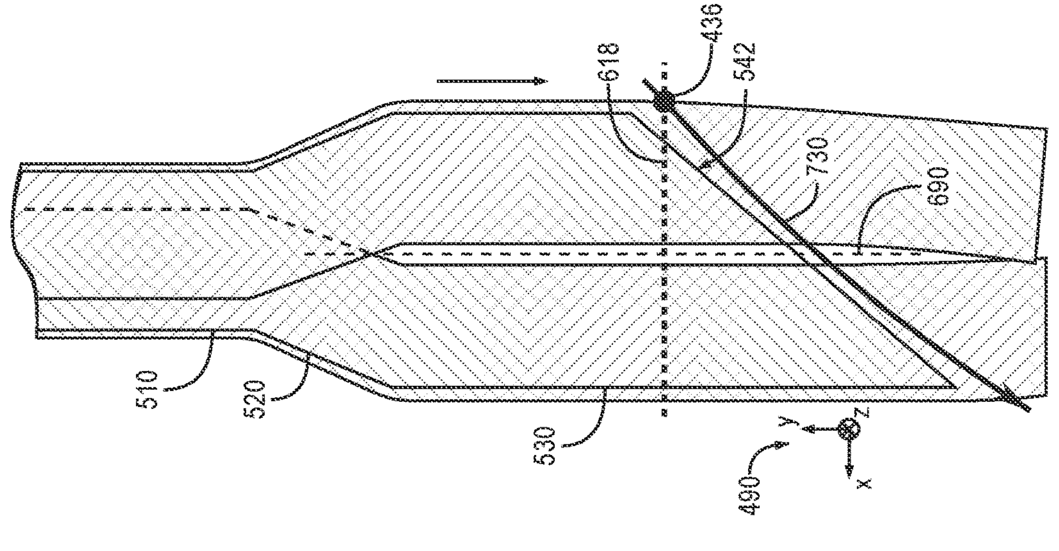
FIG. 7 illustrates a sweep path that is curved to compensate for distortion of self-wrapping split-sleeve material as it leaves the mandrel of FIGS. 5A-5C and begins to refold, according to an embodiment.

FIG. 7 illustrates one sweep path 730 that is curved to compensate for distortion of material 210 as it leaves mandrel 500 and begins to refold. Path 730 starts its sweep at a larger offset from end surface 542 when material 210 is still relatively intact and therefore relatively strongly kept in shape by mandrel 500. Path 730 gradually shifts to a minimum offset from end surface 542 at the midpoint of the sweep where enough material has been cut to compromise the strength with which the shape of material 210 is defined by mandrel 500. As the cut begins to span more than half of the diameter of material 210, the forces that cause folding of material 210 diminish. Therefore, path 730 gradually shifts to back to a larger offset from end surface 542 at the end of the sweep.

Figure 8:
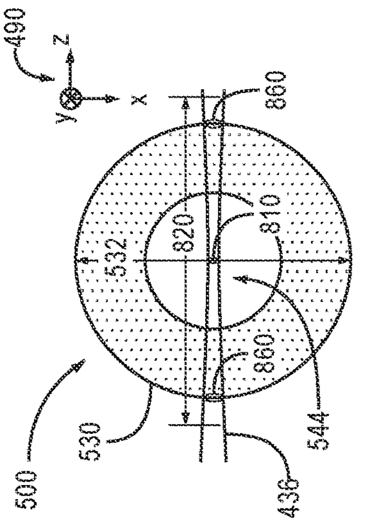
FIG. 8 illustrates the transverse profile of a laser beam relative to the mandrel of FIGS. 5A-5C in a scenario where a waist of the laser beam is at a z-axis location that coincides with the longitudinal axis of the mandrel, according to an embodiment.

FIG. 8 illustrates the transverse profile of laser beam 436 relative to mandrel 500 in one scenario where a waist 810 of laser beam 436 is at a z-axis location that coincides with the longitudinal axis (longitudinal axis 690 of FIG. 6A) of mandrel 500. FIG. 8 depicts the transverse profile of laser beam 436 overlaid on the FIG. 5C cross section of expansion portion 530 of mandrel 500. When laser beam 436 is positioned as shown in FIG. 8, the two points 860 of intersection with material 210 are at their maximum separation. The corresponding intensity of laser beam 436 at material 210 reaches its minimum value at maximally separated points 860. In the FIG. 8 scenario, the Rayleigh range 820 of laser beam 436 exceeds diameter 532 of expansion portion 530. As a result, the intensity of laser beam 436 at material 210 is not drastically reduced from the intensity at waist 810, even at maximally separated points 860. However, in instances where it is desirable or necessary to optimize the intensity of laser beam 436 at material 210, for example to complete cuts faster or with a less powerful laser beam, it may be beneficial to use a mandrel where the expansion portion has an elliptical or oval cross section, rather than a circular cross section.

Figure 9:
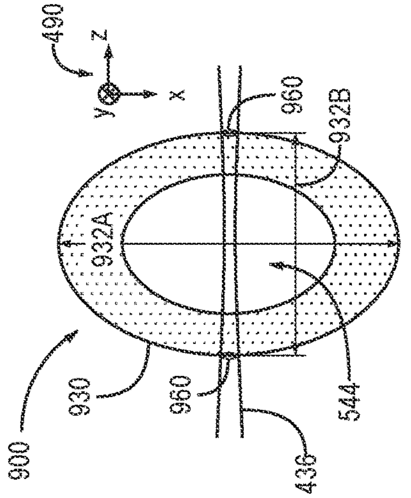
FIG. 9 illustrates a mandrel having an expansion portion with an elliptical cross section, according to an embodiment.

FIG. 9 illustrates, in a view similar to that of FIG. 8, a mandrel 900 having an expansion portion 930 with an elliptical cross section. Expansion portion 930 of mandrel 900 has the same circumference as expansion portion 530 of mandrel 500. The major axis 932A of the elliptical cross section is orthogonal to the z-axis. Advantageously, the minor axis 932B is then parallel to the z-axis and the general propagation direction of laser beam 436. This configuration of mandrel 900 increases the intensity of laser beam 436 at material 210, relative to the FIG. 8 configuration. In particular, the intensity of laser beam 436 at the two maximally separated points 960 is greater than at maximally separated points 860 in the FIG. 8 configuration.

Figure 10A:
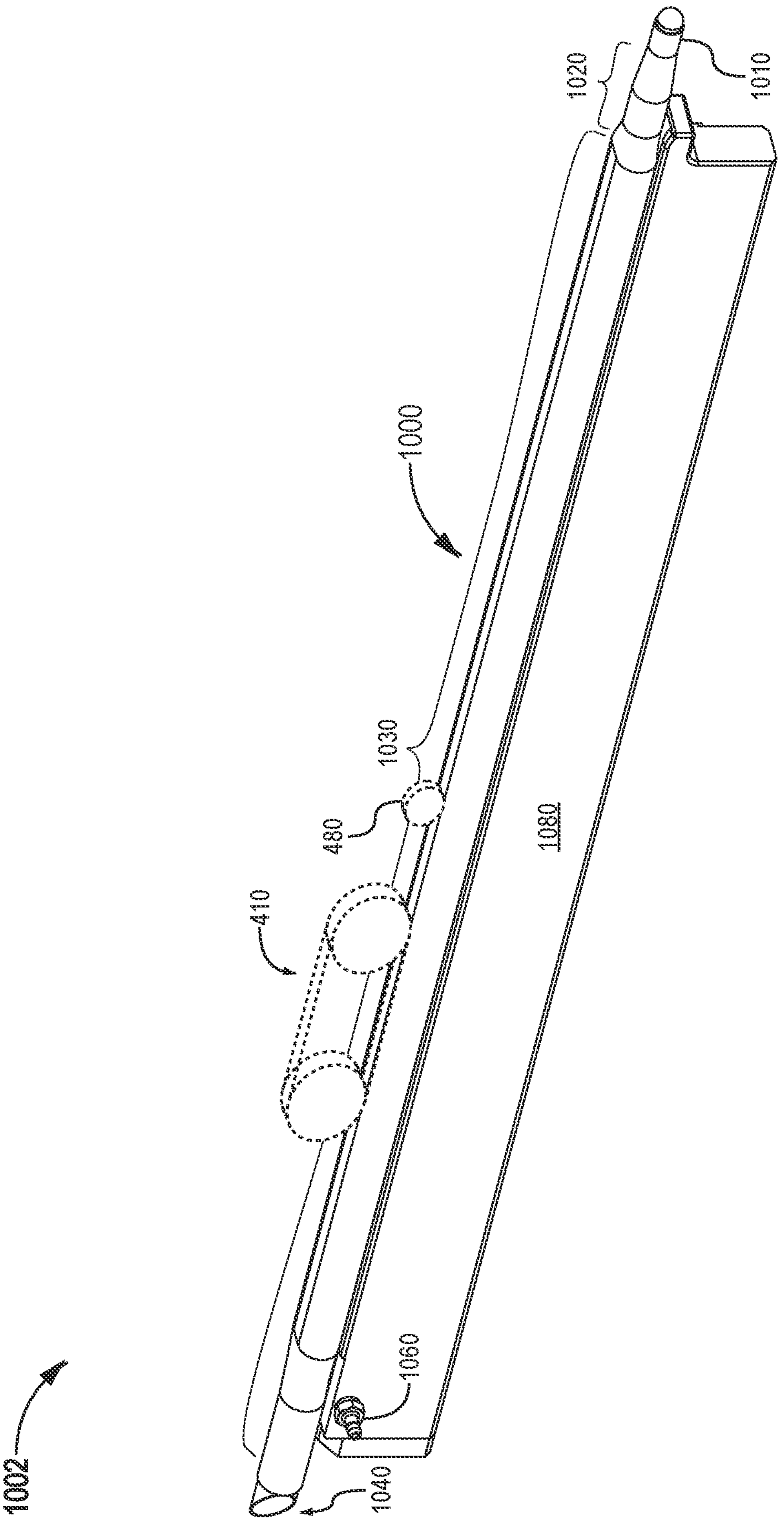
FIGS. 10A-10C illustrate a mandrel assembly with a gas intake, according to an embodiment.
Figure 10B:
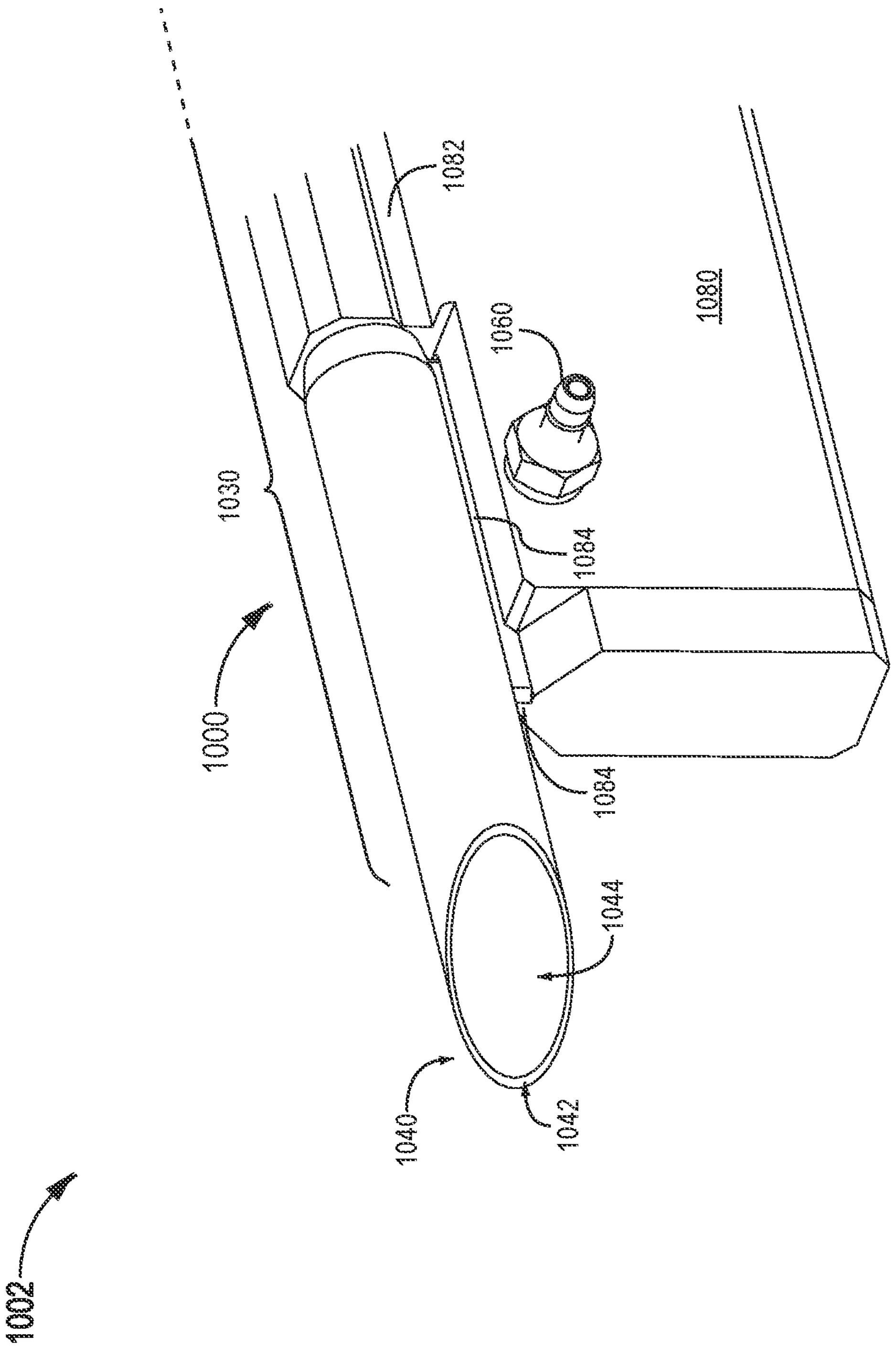
Figure 10C:
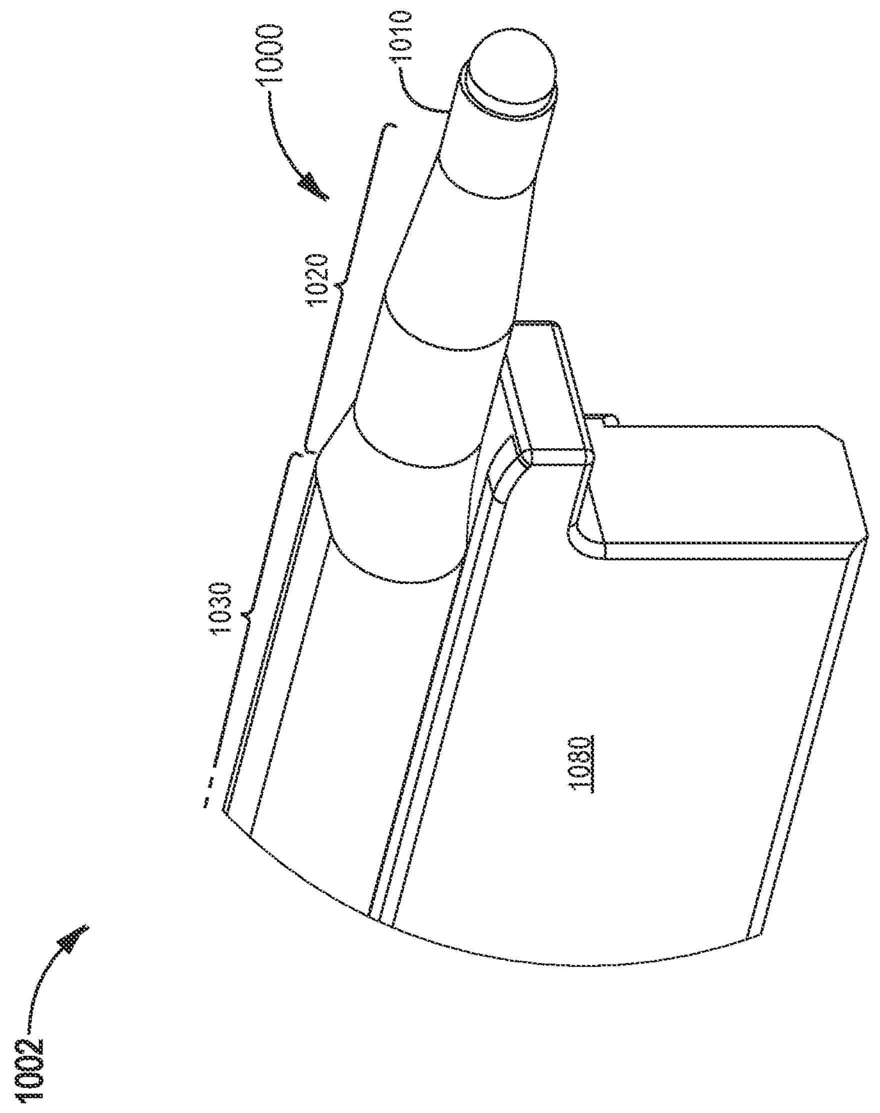

FIGS. 10A-10C illustrate one mandrel assembly 1002. Mandrel assembly 1002 may be implemented in apparatus 200. Mandrel assembly 1002 includes a mandrel 1000, a fixture 1080, and a gas intake 1060. Mandrel 1000 is an embodiment of mandrel 500 and includes a receiving portion 1010, a transition portion 1020, an expansion portion 1030, and a tip 1040. FIG. 10A is a perspective view of mandrel assembly 1002. FIG. 10B is a perspective view of a tip-end of mandrel assembly 1002. FIG. 10C is a perspective view of a receiving end of mandrel assembly 1002.

Fixture 1080 supports mandrel 1000 via bridges 1082 and 1084 (visible in FIG. 10B). In operation, receiving portion 1010 receives material 210 in a relative relaxed state with some material overlap at the longitudinal split. As material 210 moves along mandrel 1000, transition portion 1020 begins to splay out the diameter of material 210 to fully open the longitudinal split of material 210 on expansion portion 1030. Bridge 1082 define the location of gap 614 (see FIG. 6B), and bridge 1084 maintains this location of gap 614.

Mandrel 1000 forms a hollow channel 1044 extending to an end surface 1042 of tip 1040. A gas conduit through fixture 1080 and bridge 1084 connects gas intake 1060 to channel 1044.

FIG. 10A further shows exemplary positioning of conveyer 410 in apparatus 200, as well as exemplary positioning of optional encoder 480 in apparatus 200. In this example, conveyer 410 acts on material 210 at expansion portion 1030. As compared to positioning conveyer 410 before mandrel 1000, or on receiving portion 1010, the positioning of conveyer 410 on expansion portion 1030 may provide improved control over the movement of material 210 along mandrel 1000.

Without departing from the scope hereof, the apparatuses and methods described above may be applied to cutting of split looms from a continuous feed of split-loom material, as long as the split-loom material is sufficiently flexible to be expanded by a mandrel to open up the longitudinal split.

What is claimed is:

1. An apparatus for laser cutting self-wrapping split-sleeves, comprising:
- a conveyer for providing a continuous feed of self-wrapping sleeve material having a longitudinal split;
- at least one lens for focusing a laser beam to form a waist at the material;
- a scanner for sweeping the laser beam across the material along a sweep path that is at a first oblique angle to a direction of motion of the material as continuously fed by the conveyer, the first oblique angle being defined by longitudinal and transverse sweep speeds of the laser beam respectively along and orthogonal to the direction of motion of the material, the longitudinal sweep speed matching a feed rate of the continuously fed material so as to form a cut that is orthogonal to a longitudinal axis of the material, the transverse sweep speed cooperating with waist diameter, Rayleigh length, and power of the laser beam to facilitate the laser beam cutting the material in a single sweep across the material, with a pair of successively formed cuts singulating a self-wrapping split-sleeve from the material; and
- a mandrel for expanding the material before intersection with the laser beam to open a gap at the longitudinal split, the mandrel having a wedge-shaped tip with an end surface that is at a second oblique angle to the direction of motion of the material, the second oblique angle matching the first oblique angle to within 10 degrees, the mandrel being hollow to accommodate a gas flow emerging from the tip.

2. The apparatus of claim 1, the second oblique angle being between 15 and 75 degrees.

3. The apparatus of claim 1, wherein transverse dimensions of the mandrel, orthogonal to the direction of motion of the material, are between 5 and 15 millimeters, and the scanner is configured to position the sweep path with an offset from the end surface of the tip, the offset being between 0.5 and 2 millimeters.

4. The apparatus of claim 1, wherein, in dimensions transverse to the direction of motion of the material, the mandrel has a circular cross section prior to the tip and a truncated circular cross section along the tip.

5. The apparatus of claim 1, wherein, in dimensions transverse to the direction of motion of the material, the mandrel has an elliptical cross section prior to the tip and a truncated elliptical cross section along the tip, a major axis of the elliptical cross section being orthogonal to propagation direction of the laser beam.

6. The apparatus of claim 1, wherein the end surface of the mandrel is planar, and the sweep path is linear.

7. The apparatus of claim 1, wherein the end surface of the mandrel is planar, and the sweep path is curved to compensate for curling of the material upon leaving the tip.

8. The apparatus of claim 1, further comprising a gas source arranged to direct a second gas flow onto each cut.

9. The apparatus of claim 1, further comprising an exhaust system for removing fumes produced when the laser beam cuts the material.

10. The apparatus of claim 1, further comprising a receptacle facing the tip and configured to collect each self-wrapping split-sleeve by suction.

11. The apparatus of claim 1, further comprising:

an encoder for measuring the feed rate; and a controller communicatively coupled with the scanner and the encoder, the controller configured to set the longitudinal sweep speed according to the feed rate as measured by the encoder.

12. The apparatus of claim 1, the scanner including a galvanometer scanner.

13. The apparatus of claim 1, the scanner including:

a first galvanometer scanner configured to sweep the laser beam in dimension parallel to the direction of motion of the material; and a second galvanometer scanner configured to sweep the laser beam in dimension orthogonal to the direction of motion of the material.

14. The apparatus of claim 1, further comprising a carbon dioxide laser for generating the laser beam.

15. A method for laser cutting self-wrapping split-sleeves, comprising steps of:

continuously feeding self-wrapping sleeve material with a longitudinal split over a mandrel to open a gap along the longitudinal split;

cutting the material by focusing and scanning a laser beam to sweep a waist of the laser beam across the material along a sweep path that is at a tip of the mandrel and oriented at a first oblique angle to a direction of motion of the material, wherein (a) a longitudinal sweep speed of the laser beam waist along the direction of motion matches a feed rate of the material so as to form a cut that is orthogonal to a longitudinal axis of the material, (b) a transverse sweep speed of the laser beam waist orthogonal to the direction of motion cooperates with waist diameter, Rayleigh length, and power of the laser beam to cause the laser beam to complete the cut in a single sweep across the material such that a pair of successively formed cuts singulates a self-wrapping split-sleeve from the material, wherein (c) the tip of the mandrel is wedge-shaped with an end surface that is at a second oblique angle to the direction of motion of the material, the second oblique angle matching the first oblique angle to within 10 degrees, and (d) the laser beam melts the material to fuse weave of the self-wrapping split-sleeve at each of its two ends; and directing a gas flow through a hollow of the mandrel and out of the tip to push waste material, produced by the cutting step, away from the mandrel.

16. The method of claim 15, further comprising directing a second gas flow toward an end of the self-wrapping split-sleeve, as the end is formed in the cutting step, to quench or prevent combustion.

* * * * *